US008111762B2

(12) United States Patent
Miyoshi et al.

(10) Patent No.: US 8,111,762 B2
(45) Date of Patent: Feb. 7, 2012

(54) RADIO TRANSMISSION APPARATUS, RADIO RECEPTION APPARATUS, RADIO TRANSMISSION METHOD, AND RADIO RECEPTION METHOD

(75) Inventors: Kenichi Miyoshi, Kanagawa (JP); Akihiko Nishio, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1139 days.

(21) Appl. No.: 11/658,257

(22) PCT Filed: Jul. 14, 2005

(86) PCT No.: PCT/JP2005/013093
§ 371 (c)(1),
(2), (4) Date: Jan. 24, 2007

(87) PCT Pub. No.: WO2006/011376
PCT Pub. Date: Feb. 2, 2006

(65) Prior Publication Data
US 2008/0304583 A1    Dec. 11, 2008

(30) Foreign Application Priority Data
Jul. 29, 2004    (JP) ................................. 2004-222388

(51) Int. Cl.
*H04K 1/10*    (2006.01)
*H04L 27/28*    (2006.01)
(52) U.S. Cl. ........................................ 375/260; 375/295
(58) Field of Classification Search ............... 375/260, 375/295
See application file for complete search history.

(56) References Cited

U.S. PATENT DOCUMENTS 6,744,828 B1 * 6/2004 Uchiyama et al. ............ 375/326
6,816,452 B1 * 11/2004 Maehata ....................... 370/208

FOREIGN PATENT DOCUMENTS

| JP | 2000-332722 | 11/2000 |
| JP | 2001-94524  | 4/2001  |
| JP | 2002-84195  | 3/2002  |
| JP | 2002-171239 | 6/2002  |
| JP | 2003-273799 | 9/2003  |

OTHER PUBLICATIONS

David Falconer, Sirikiat Lek Ariyavisitakul, Anader Benyamin-Seeyar, Brian Eidson, "Frequency Domain Equalization for Single-Carrier Broadband Wireless Systems," IEEE Communications Magazine o Apr. 2002.*
PCT/JP2005/013093 English Translation of the Written Opinion of the International Search Authority.*
PCT/JP2005/013093 English Translation of International Preliminary Report on Patentability Chapter I.*

(Continued)

*Primary Examiner* — Shuwang Liu
*Assistant Examiner* — Nader Bolourchi
(74) *Attorney, Agent, or Firm* — Dickinson Wright PLLC (57) ABSTRACT

A radio transmission device capable of improving channel estimation precision for each frequency. In this device, an FFT unit (103) subjects a data signal to a Fourier transformation. A signal substitution unit (108) substitutes the frequency component of a portion of a plurality of frequency components composing the Fourier-transformed data signal, for a pilot signal. An IFFT unit (109) subjects the data signal, the frequency component of which has been partially substituted for the pilot signal, to an inverse Fourier transformation. A transmission RF unit (111) transmits the inversely Fourier-transformed data signal on a single carrier.

9 Claims, 12 Drawing Sheets

OTHER PUBLICATIONS

Japanese Notice of the Reasons for Rejection dated Dec. 7, 2010.
N. Chen, et al.: "Channel Equalisation for OFDM Using Scattered Pilots," Vehicular Technology Conference, 2002, VTC Spring 2002, IEEE 55th, vol. 2, May 6-9, 2002, pp. 1040-1044.

H. Kobayashi et al., "Tekio Hencho o Mochiita Single Carrier OFDM Tsushin Hoshiki (Single carrier OFDM Technique with Adaptive Modulation Method)" The Transaction of IEICE, vol. J86-A, No. 12, Dec. 1, 2003, pp. 1329-1339.

* cited by examiner

RADIO TRANSMISSION APPARATUS, RADIO RECEPTION APPARATUS, RADIO TRANSMISSION METHOD, AND RADIO RECEPTION METHOD

RELATED APPLICATIONS

The present application is a 35 USC 371 application of PCT/JP2005/013093, filed Jul. 14, 2005, which is based on Japanese Patent Application No. 2004-222388, filed Jul. 29, 2004, the entire contents of each of which are expressly incorporated herein by reference.

TECHNICAL FIELD

The present invention relates to a radio transmitting apparatus, radio receiving apparatus, radio transmitting method, and radio receiving method, and more particularly to a radio transmitting apparatus, radio receiving apparatus, radio transmitting method, and radio receiving method used in a frequency equalization single-carrier transmission system.

BACKGROUND ART

In recent years, frequency equalization single-carrier transmission systems have been studied with an eye toward next-generation mobile communication systems. In a frequency equalization single-carrier transmission system, data symbols arranged in the time axis direction are transmitted by a single carrier. A receiver corrects signal distortion in the transmission path by equalizing that distortion on the frequency axis. More specifically, the receiver calculates a channel estimation value for each frequency on the frequency axis, and performs weighting for equalizing propagation distortion on a frequency-by-frequency basis. Then the received data is demodulated (see Non-patent Document 1, for example). Therefore, in this system, there is a strong demand for a technology that will improve the precision of per-frequency channel estimation.

Figure 1:
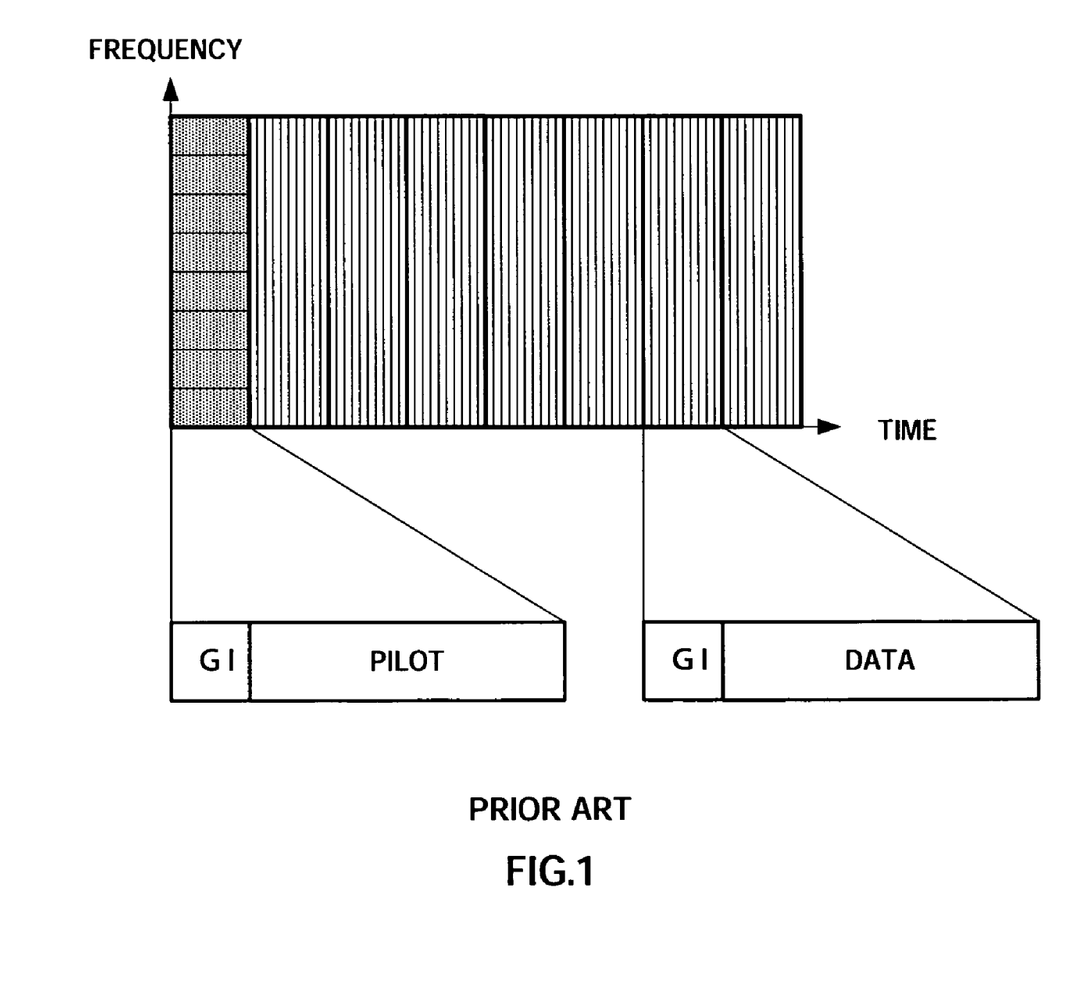
FIG. 1 is a drawing showing an example of conventional frequency equalization single-carrier transmission.
Figure 2:
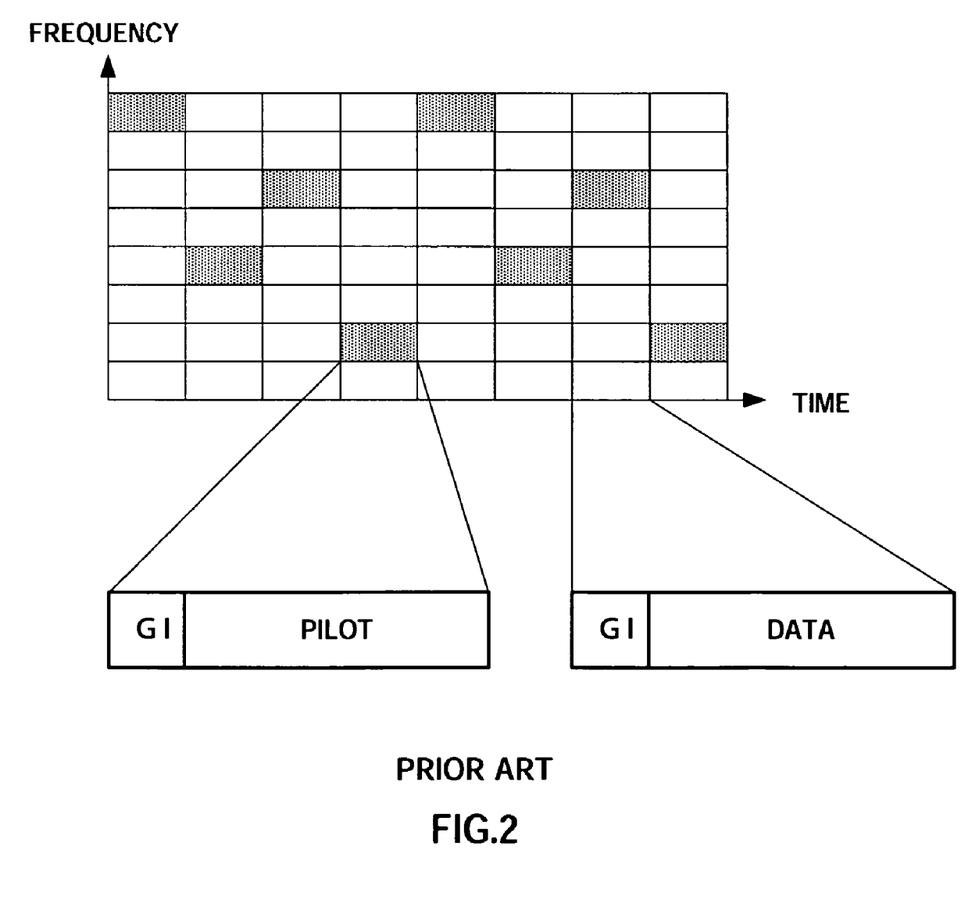
FIG. 2 is a drawing showing an example of conventional scattered pilots.

Generally, in a conventional frequency equalization single-carrier transmission system, slots on the time axis are defined as pilot slots that are used to perform per-frequency channel estimation value calculation, as shown in FIG. 1. Known pilot symbols for each frequency are then transmitted in the pilot slots.

With the OFDM (Orthogonal Frequency Division Multiplexing) method, in which data symbols are arranged in the frequency axis direction and transmitted by multiple carriers, a known pilot symbol is transmitted for each subcarrier actually used in radio transmission.

With OFDM, a technology called "scattered pilots" has been proposed as a technology for improving the precision of channel estimation. With scattered pilots, a pilot symbol is transmitted on one of the subcarriers on the frequency axis (see Non-patent Document 2, for example).

Non-patent Document 1: "Frequency Domain Equalization for single-Carrier Broadband Wireless Systems", IEEE Communications Magazine, April 2002, pp. 58-66

Non-patent Document 2: "Channel Equalisation for OFDM Using Scattered Pilots", Chen, N., Heaton, R., Tanaka, M., Vehicular Technology Conference, 2002. VTC Spring 2002. IEEE 55th, Volume 2, 6-9 May 2002 Pages 1040-1044, Vol. 2

DISCLOSURE OF INVENTION

Problems to be Solved by the Invention

However, in an above-described conventional frequency equalization single-carrier transmission system, the following problem arises when scattered pilots are introduced in order to improve the precision of channel estimation.

Figure 3:
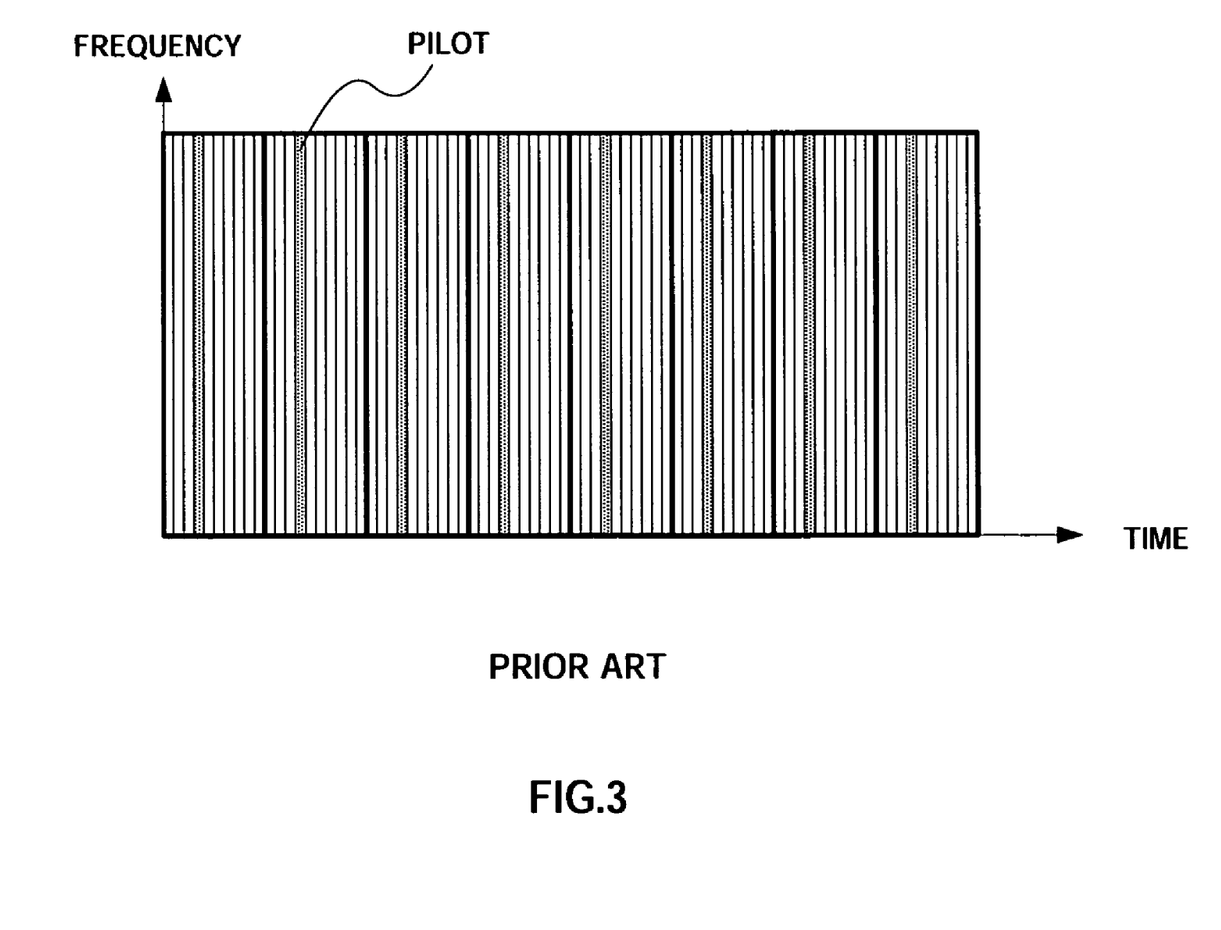
FIG. 3 is a drawing showing an example of the application of scattered pilots to conventional frequency equalization single-carrier transmission.

Namely, in frequency equalization single-carrier transmission, as stated above, symbols are arranged in the time axis direction. Therefore, when above-described scattered pilots are applied simply to frequency equalization single-carrier transmission, a specific data symbol is replaced by a pilot symbol on the time axis. However, as shown in FIG. 3, a pilot symbol transmitted by means of such a method interferes with a data signal on the frequency axis when converted to a signal on the frequency axis on the receiver side. Consequently, it is not possible to calculate a channel estimation value for each frequency on the frequency axis.

It is an object of the present invention to provide a radio transmitting apparatus, radio receiving apparatus, radio transmitting method, and radio receiving method that enable the precision of per-frequency channel estimation to be improved.

Means for Solving the Problems

A radio transmitting apparatus of the present invention employs a configuration that includes: a conversion section that executes time-domain to frequency-domain conversion on a data signal; a replacement section that replaces a frequency component of one part among a plurality of frequency components composing a data signal on which conversion is executed by a pilot signal; a reverse-conversion section that executes frequency-domain to time-domain reverse-conversion on a data signal in which the frequency component of one part has been replaced by a pilot signal; and a transmitting section that transmits by means of a single carrier a data signal on which reverse-conversion has been executed.

A radio receiving apparatus of the present invention employs a configuration that, in the above-described configuration, further includes: a thinning-out section that thins out a part corresponding to a pilot signal within a data signal on which conversion has been executed; and an equalization processing section that performs equalization processing on the frequency axis based on a channel estimation result on a data signal in which a part corresponding to a pilot signal has been thinned out.

A radio transmitting method of the present invention includes: a conversion step of executing time-domain to frequency-domain conversion on a data signal; a replacement step of replacing a frequency component of one part among a plurality of frequency components composing a data signal on which conversion has been executed by a pilot signal; a reverse-conversion step of executing frequency-domain to time-domain reverse-conversion on a data signal in which the frequency component of one part has been replaced by a pilot signal; and a transmitting step of transmitting by means of a single carrier a data signal on which reverse-conversion has been executed.

A radio receiving method of the present invention includes: a receiving step of receiving a data signal that is transmitted by a single carrier and is composed of a plurality of frequency components, and in which a frequency component of one part among the plurality of frequency components has been replaced by a pilot signal; a conversion step of executing time-domain to frequency-domain conversion on a received data signal; and a channel estimation step of performing channel estimation for each of the plurality of frequency components using a part corresponding to a pilot signal within a data signal on which conversion has been executed.

Advantageous Effect of the Invention

The present invention enables the precision of per-frequency channel estimation to be improved.

BEST MODE FOR CARRYING OUT THE INVENTION

Embodiments of the present invention will now be described in detail with reference to the accompanying drawings.

Embodiment 1

Figure 4:
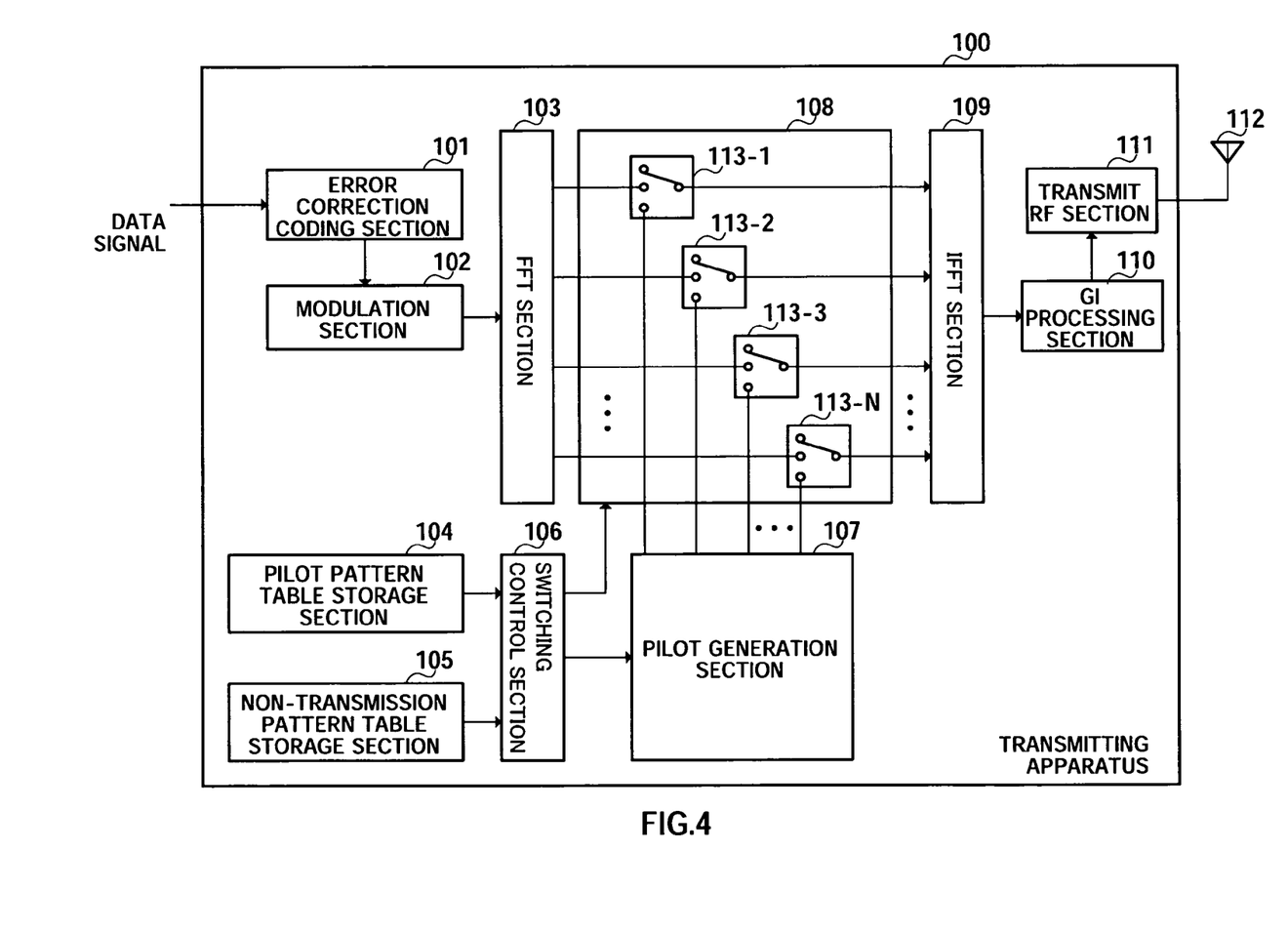
FIG. 4 is a block diagram showing the configuration of a transmitting apparatus according to Embodiment 1 of the present invention.
Figure 5:
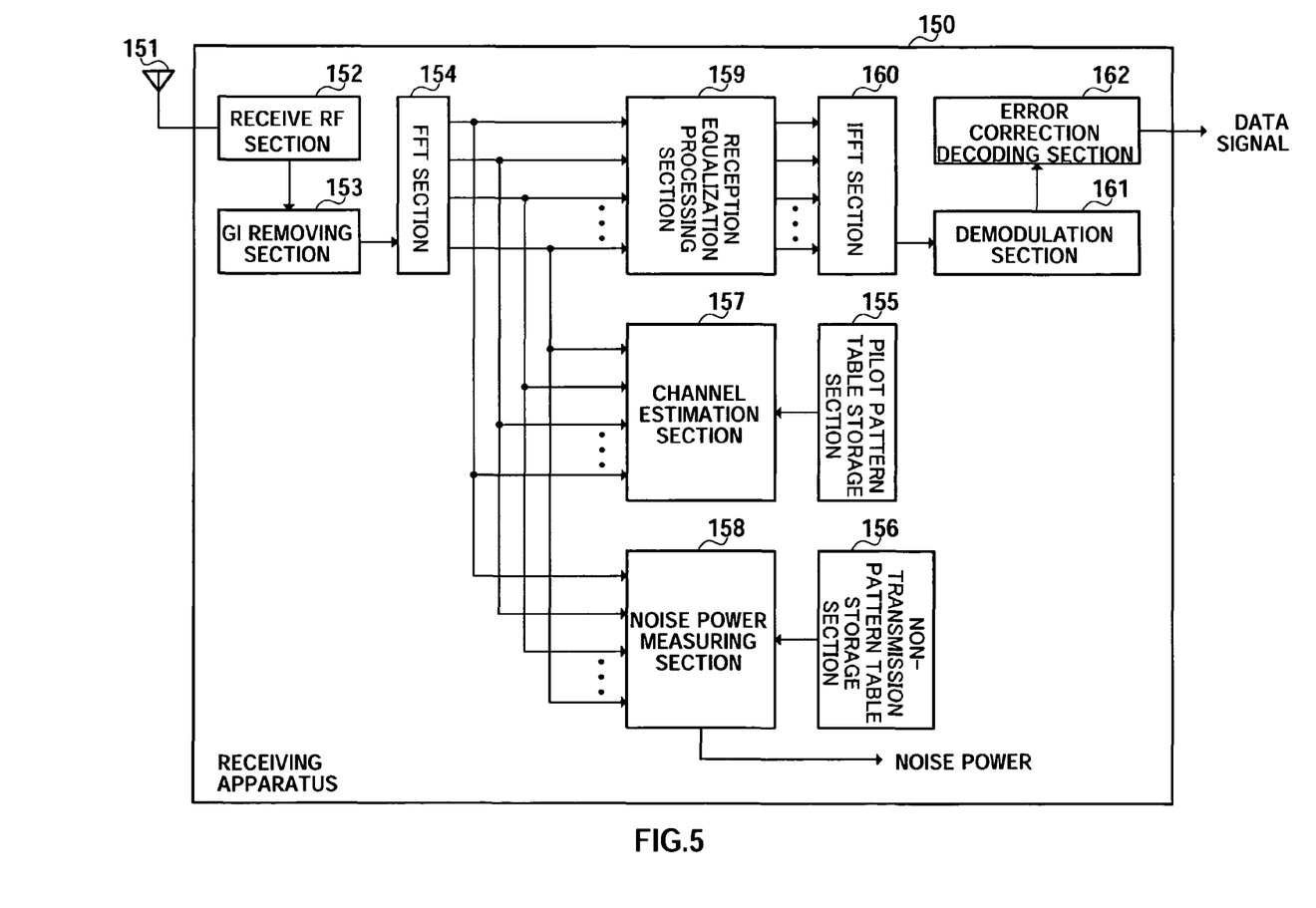
FIG. 5 is a block diagram showing the configuration of a receiving apparatus according to Embodiment 1 of the present invention.

FIG. 4 is a block diagram showing the configuration of a transmitting apparatus according to Embodiment 1 of the present invention, and FIG. 5 is a block diagram showing the configuration of a receiving apparatus that performs radio communication with transmitting apparatus 100.

Transmitting apparatus 100 has an error correction coding section 101, a modulation section 102, an FFT (Fast Fourier Transform) section 103, a pilot pattern table storage section 104, a non-transmission pattern table storage section 105, a switching control section 106, a pilot generation section 107, a signal replacement section 108, an IFFT (Inverse Fast Fourier Transform) section 109, a GI (Guard Interval) processing section 110, a transmit RF section 111, and an antenna 112. Signal replacement section 108 has a plurality of (for example, N) switching sections 113-1, 113-2, 113-3, . . . , 113-N.

Switching sections 113-1 through 113-N correspond to a plurality of frequencies (or a plurality of frequency bands) in a single-carrier band used for data signal transmission, and all have the same configuration. Therefore, in the following descriptions, any of these will be referred to simply as "switching section(s) 113."

Here, each frequency (or each frequency band) can be considered as a virtual subcarrier in the single-carrier band, and can also be considered as a subband representing fragmentation of the used single-carrier band. Therefore, for the sake of convenience, each frequency (or each frequency band) may also be referred to as a "subcarrier" in the following description. Also, a signal component corresponding to a frequency (or frequency band)—that is, a frequency component—is referred to as a "component."

In transmitting apparatus 100, a data signal in which data addressed to a receiving apparatus 150 is arranged in the time axis direction undergoes error correction coding processing by error correction coding section 101 and modulation processing by modulation section 102, and is input to FFT section 103.

FFT section 103 executes FFT processing on a data signal including a data channel signal. By this means, a data signal is converted from a time-domain signal to a frequency-domain signal, and becomes a data signal composed of N components. FFT section 103 of this embodiment uses FFT processing for time-domain to frequency-domain conversion, but conversion processing that can be used is not limited to FFT processing, and it is also possible to use other suitable processing such as DCT (Discrete Cosine Transform) processing or wavelet conversion processing, for example.

A pilot pattern table, which is information indicating a pattern according to which scattered pilot signals (hereinafter referred to as "pilot signals") are embedded, is stored in pilot pattern table storage section 104 beforehand. This pattern is arranged in advance between transmitting apparatus 100 and receiving apparatus 150.

A non-transmission pattern table, which is information indicating a pattern according to which data signal transmission is not performed, is stored beforehand in non-transmission pattern table storage section 105. This pattern is arranged in advance between transmitting apparatus 100 and receiving apparatus 150.

In this embodiment, configurations are described by way of example in which a pilot pattern table and non-transmission pattern table are stored in advance in both transmitting apparatus 100 and receiving apparatus 150, but the configurations of transmitting apparatus 100 and receiving apparatus 150 are not limited to this. For example, configurations may also be used whereby transmitting apparatus 100 multiplexes (by time division multiplexing, for instance) a pilot pattern table and non-transmission pattern table, and transmits them to receiving apparatus 150, and receiving apparatus 150 stores the received pilot pattern table and non-transmission pattern table internally.

Switching control section 106 controls switching by switching sections 113 in signal replacement section 108 in accordance with a pilot pattern table stored in pilot pattern table storage section 104 and a non-transmission pattern table stored in non-transmission pattern table storage section 105. Switching control section 106 also outputs a directive signal to pilot generation section 107 in accordance with the pilot pattern table.

Pilot generation section 107 generates a known pilot signal for each subcarrier, and inputs a pilot signal to switching section 113 in accordance with a directive signal from switching control section 106.

Signal replacement section 108 replaces one part among N components composing a data signal on which FFT processing has been executed by a pilot signal. Replacement is implemented by having switching processing performed by switching sections 113 under the control of switching control section 106.

Also, signal replacement section 108 thins out another part among the N components composing a data signal on which FFT processing has been executed—that is, a part different from a part subject to replacement. As with above-described replacement, thinning-out is performed by switching sections 113 under the control of switching control section 106.

For example, when replacement and thinning-out are not performed for a corresponding component, switching section 113 constantly outputs an input component from FFT section 103 to IFFT section 109. Also, when a corresponding component is replaced by a pilot signal, switching section 113 switches the input/output state so that an input signal from pilot generation section 107 is output to IFFT section 109 instead of an input component from FFT section 103. That is to say, at this time, an input component from FFT section 103 is eliminated, and an input signal from pilot generation section 107 is inserted instead. Also, when a corresponding component is thinned out, switching section 113 switches the input/output state so that neither an input component from FFT section 103 nor an input signal from pilot generation section 107 is output to IFFT section 109. That is to say, an input component from FFT section 103 is eliminated in the same way as in the case of replacement.

A data signal that has undergone replacement and thinning-out under the control of switching control section 106—that is, in accordance with the pilot pattern table and non-transmission pattern table—is input to IFFT section 109.

IFFT section 109 executes IFFT processing on a data signal input from signal replacement section 108. By this means, a data signal undergoes reverse-conversion from a frequency-domain signal to a time-domain signal. IFFT section 109 of this embodiment uses IFFT processing for frequency-domain to time-domain reverse-conversion, but conversion processing that can be used is not limited to IFFT processing, and it is also possible to use other suitable processing such as inverse DCT processing or inverse wavelet conversion processing, for example.

GI processing section 110 adds a GI for reducing the effects of inter-symbol interference to a data signal on which IFFT processing has been executed. Transmit RF section 111 executes predetermined transmission processing such as D/A conversion and up-conversion on a data signal to which a GI has been added, and transmits the signal to receiving apparatus 150 by means of a single carrier via antenna 112.

Receiving apparatus 150 has an antenna 151, a receive RF section 152, a GI removing section 153, an FFT section 154, a pilot pattern table storage section 155, a non-transmission pattern table storage section 156, a channel estimation section 157, a noise power measuring section 158, a reception equalization processing section 159, an IFFT section 160, a demodulation section 161, and an error correction decoding section 162.

Receive RF section 152 executes predetermined reception processing such as down-conversion and A/D conversion on a data signal received via antenna 151. GI removing section 153 removes a GI added to the data signal.

FFT section 154 executes FFT processing on a data signal on which GI removal has been performed. By this means, the data signal is converted from a time-domain signal to a frequency-domain signal. FFT section 154 of this embodiment uses FFT processing for time-domain to frequency-domain conversion, but conversion processing that can be used is not limited to FFT processing, and it is also possible to use other suitable processing such as DCT processing or wavelet conversion processing, for example.

A pilot pattern table is stored beforehand in pilot pattern table storage section 155, and a non-transmission pattern table is stored beforehand in non-transmission pattern table storage section 156.

Channel estimation section 157 extracts a component corresponding to a pilot signal from a data signal on which FFT processing has been executed in accordance with a pilot pattern table stored in pilot pattern table storage section 155, and performs channel estimation using that extracted component. For example, frequency-direction interpolation processing is performed using the extracted component, and a channel estimation value is thereby calculated for each frequency.

Reception equalization processing section 159 performs equalization processing on the frequency axis for a data signal on which FTT processing has been executed based on a calculated channel estimation value. Equalization processing on the frequency axis is executed by performing weighting for equalizing propagation path distortion on a frequency-by-frequency basis. A data signal on which frequency equalization processing has been executed undergoes IFFT processing by IFFT section 160, demodulation processing by demodulation section 161, and error correction decoding processing by error correction decoding section 162. IFFT section 160 of this embodiment uses IFFT processing for frequency-domain to time-domain reverse-conversion, but conversion processing that can be used is not limited to IFFT processing, and it is also possible to use other suitable processing such as inverse DCT processing or inverse wavelet conversion processing, for example.

Noise power measuring section 158 measures the received power of a component thinned out from the N components of a data signal on which FFT processing has been executed according to the non-transmission pattern table stored in non-transmission pattern table storage section 156. As the received power of a thinned out part is measured in this way, noise power can be measured accurately. The measured noise power can be used for SIR or CIR measurement.

Figure 6:
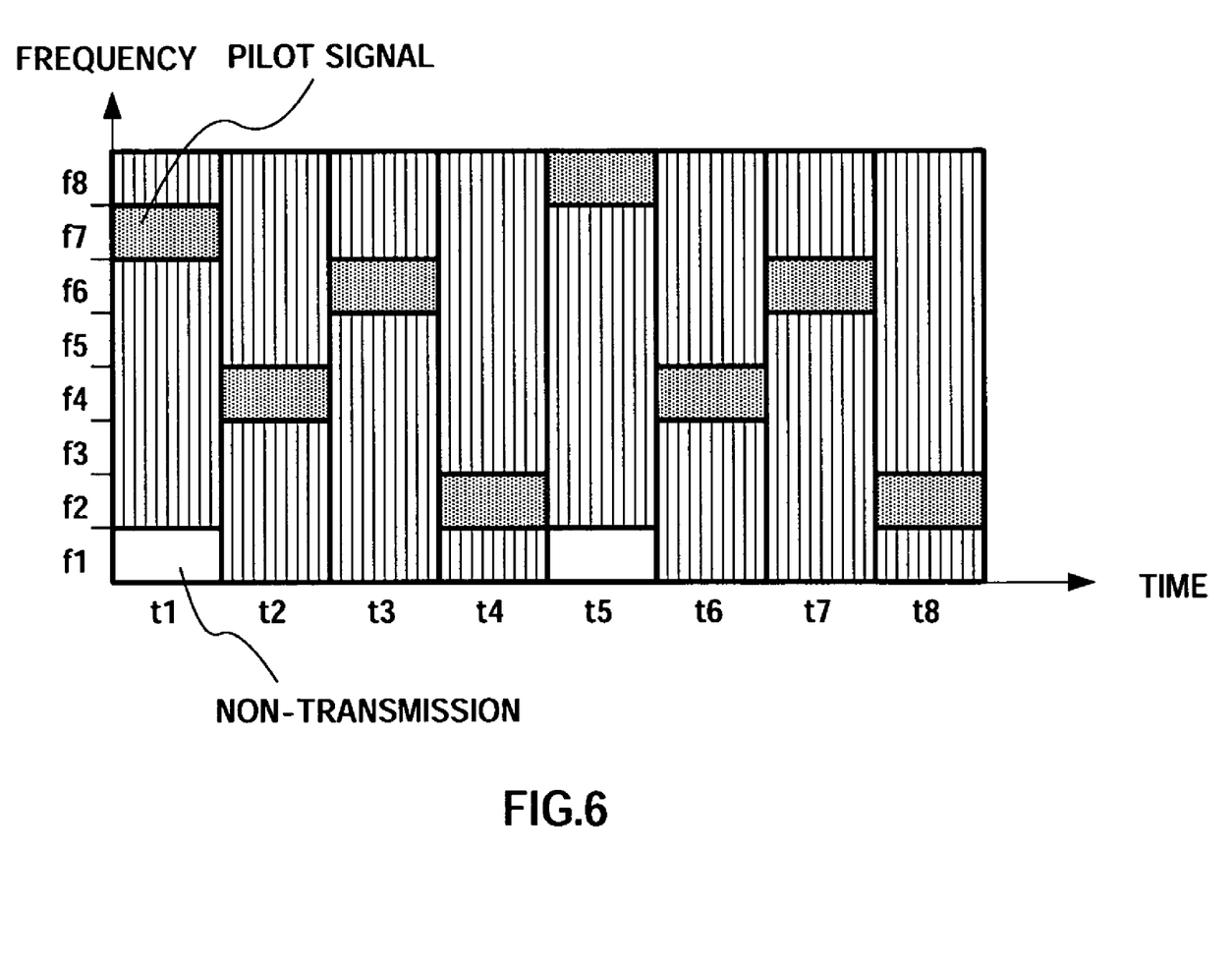
FIG. 6 is a drawing for explaining the operation of a transmitting apparatus according to Embodiment 1 of the present invention.

Next, data signal replacement and thinning-out operations by signal replacement section 108 of transmitting apparatus 100 with the above configuration will be described. FIG. 6 is a drawing for explaining the operation of transmitting apparatus 100.

Here, four symbol sections are assumed to be a cycle of a pattern whereby data signal non-transmission is generated (that is, a non-transmission pattern). A pilot pattern of a predetermined cycle is also used.

As shown in FIG. 6, at timing t1, the frequency f1 component is thinned out. At the same time as this, the frequency f7 component is replaced by a pilot signal. Then, at timing t2, the frequency f4 component is replaced by a pilot signal. At timing t3, the frequency f6 component is replaced by a pilot signal. At timing t4, the frequency f2 component is replaced by a pilot signal.

At timing t5, the frequency f1 component is thinned out. At the same time as this, the frequency f8 component is replaced by a pilot signal. Then, at timing t6, the frequency f4 component is replaced by a pilot signal. At timing t7, the frequency f6 component is replaced by a pilot signal. At timing t8, the frequency f2 component is replaced by a pilot signal.

Thus, according to this embodiment, one part among N components composing a data signal on which FFT processing has been executed is replaced by a pilot signal, and therefore, in a data signal transmitted by a single carrier, a data symbol and pilot symbol can be multiplexed on the frequency axis without interference, a channel estimation value can be obtained for each frequency on the receiver side, and the precision of per-frequency channel estimation can be improved.

Also, according to this embodiment, a part different from a part subject to replacement is thinned out from among N components, and therefore a component for which transmission is not performed can be generated, and, for example, when the received power of this component is measured on the receiver side, noise power can be measured accurately.

Embodiment 2

Figure 7:
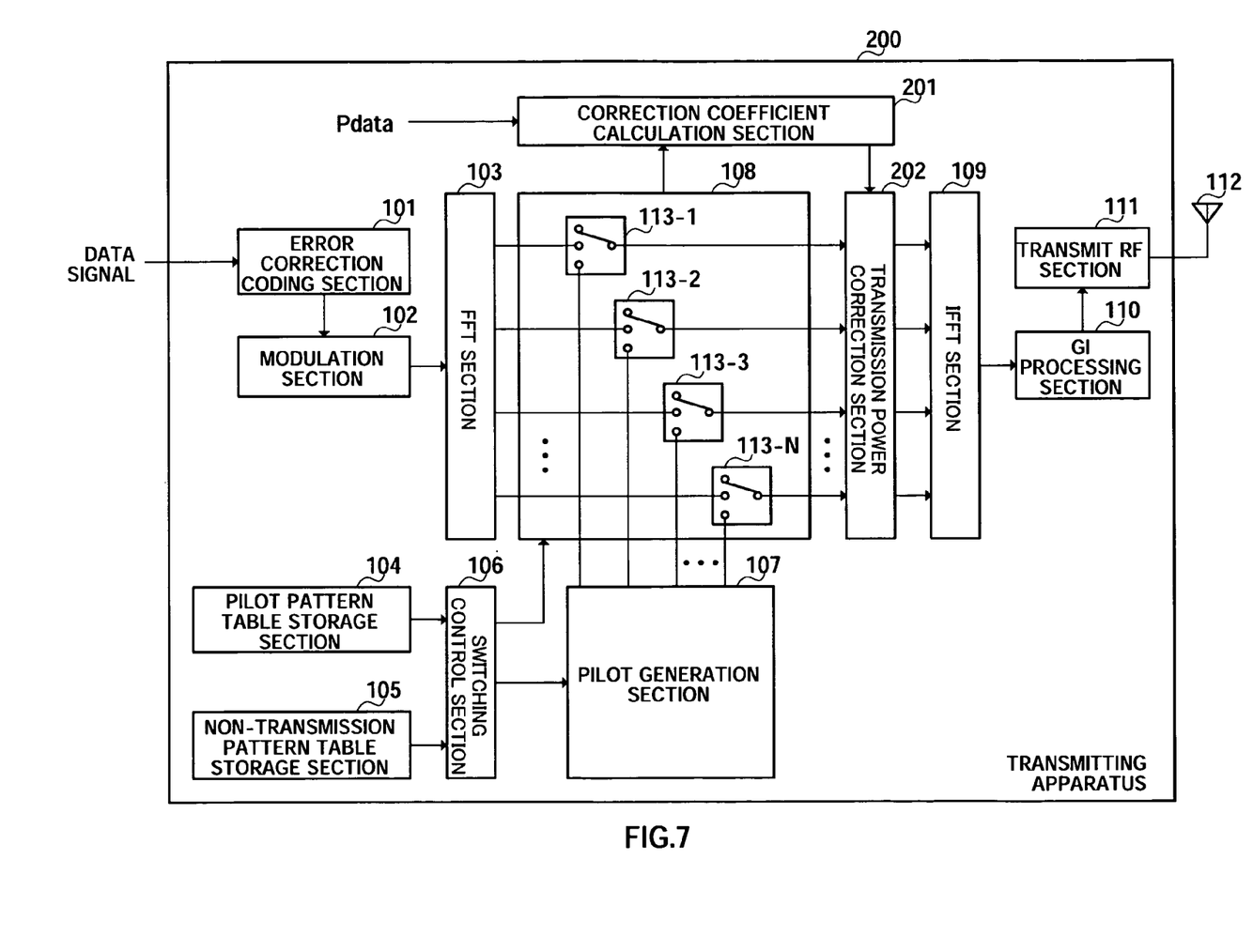
FIG. 7 is a block diagram showing the configuration of a transmitting apparatus according to Embodiment 2 of the present invention.

FIG. 7 is a block diagram showing the configuration of a transmitting apparatus according to Embodiment 2 of the present invention. Transmitting apparatus 200 shown in FIG. 7 has a similar basic configuration to that of transmitting apparatus 100 in FIG. 4, and therefore identical configuration elements are assigned the same reference numerals, and detailed descriptions thereof are omitted.

In addition to the configuration elements of transmitting apparatus 100, transmitting apparatus 200 has a correction coefficient calculation section 201 and a transmission power correction section 202. Transmitting apparatus 200 performs radio communication with receiving apparatus 150 described in Embodiment 1.

Correction coefficient calculation section 201 calculates a correction coefficient W for correcting data channel transmission power based on total transmission power Pdata assigned beforehand to a data channel, and the sum of transmission power of components thinned out by signal replacement section 108 (hereinafter referred to as "transmission power Poff"). For example, correction coefficient W is calculated by means of following Equation (1).

$$W = P\text{data}/(P\text{data} - P\text{off}) \quad (1)$$

Transmission power correction section 202 corrects data channel transmission power by multiplying calculated correction coefficient W by components excluding a component of a part subject to replacement and a component of a part subject to thinning-out among the input signals from signal replacement section 108. That is to say, when replacement or thinning-out is performed, data channel transmission power is controlled.

In this embodiment, transmission power correction is performed after thinning-out has been performed, but transmission power correction may be performed before thinning-out is performed.

Transmission power correction by transmission power correction section 202 of transmitting apparatus 200 will now be described. Operations in transmitting apparatus 200 will be described using the examples shown in FIG. 8A, FIG. 8B, FIG. 8C, FIG. 9A, FIG. 9B, and FIG. 9C.

Figure 8A:
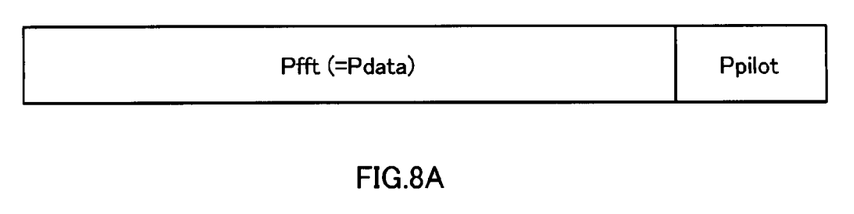
FIG. 8A is a drawing showing the total transmission power of a data signal on which FTT processing has been executed.
Figure 8B:
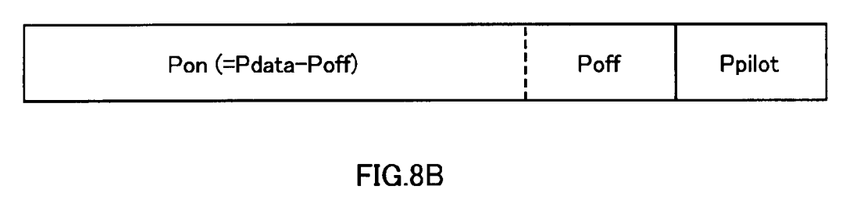
FIG. 8B is a drawing showing the total transmission power of a data signal on which thinning-out processing has been executed.

The first example will now be described. As shown in FIG. 8A, transmission power Pfft of a data signal on which FTT processing has been executed is the same as transmission power Pdata assigned beforehand to a data channel. Separately from transmission power Pdata, transmission power Ppilot is assigned to a pilot signal, which is a pilot channel signal. Then, when a certain component within a data signal is eliminated, transmission power Pon of the data signal in which the certain component has been eliminated becomes smaller than transmission power Pdata by transmission power Poff, as shown in FIG. 8B. The eliminated component may be a component subject to thinning-out or a component subject to replacement.

Figure 8C:
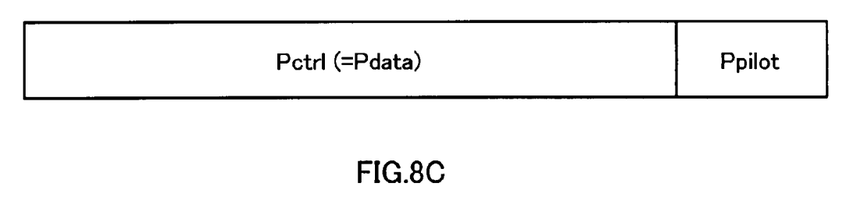
FIG. 8C is a drawing showing the total transmission power of a data signal on which transmission power correction has been executed.

Then, in transmission power correction section 202, calculated correction coefficient W is multiplied by transmission power Pon. Consequently, transmission power Pctrl is made the same value as transmission power Pdata, as shown in FIG. 8C. In this way, total data channel transmission power can be kept constant, transmission power Pdata can be used efficiently, and receiver error rate characteristics can be improved.

More specifically, in transmission power correction section 202, transmission power Pon is increased by the proportion indicated by correction coefficient W. Alternatively, transmission power Pon is increased by transmission power Poff. Alternatively, transmission power Pon is increased to transmission power Pdata. By this means, the utilization efficiency of transmission power Pdata can be improved. Furthermore, the proportion by which transmission power Pon is increased can be controlled, the width by which transmission power Pon is increased can be controlled, and the target value of increased transmission power Pon can be controlled.

Figure 9A:
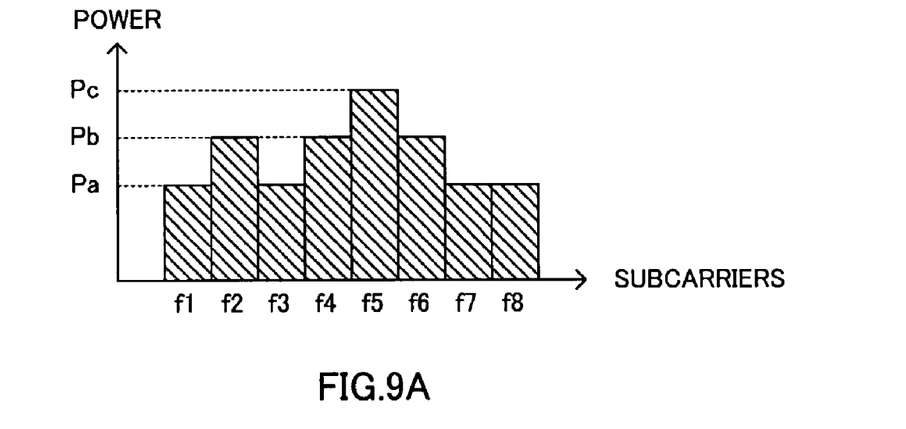
FIG. 9A is a drawing showing transmission power by subcarrier of a data signal on which FTT processing has been executed.
Figure 9B:
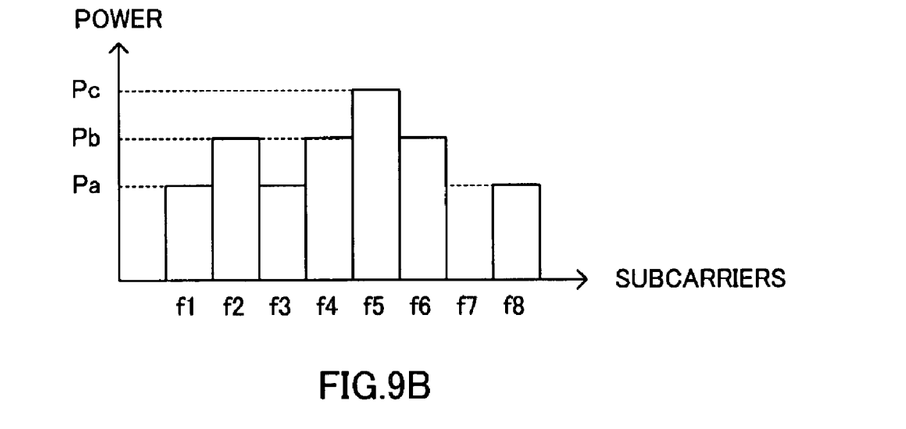
FIG. 9B is a drawing showing transmission power by subcarrier of a data signal on which thinning-out processing has been executed.

The second example will now be described. The transmission power of each subcarrier of a data signal on which FFT processing has been executed is as shown in FIG. 9A. Then, in signal replacement section 108, a subcarrier to be eliminated at each timing is decided in accordance with a pilot pattern table and non-transmission pattern table. In this example, a component corresponding to the frequency f7 subcarrier is eliminated, as shown in FIG. 9B. Therefore, the total transmission power of the data signal is decreased by transmission power Pa of the eliminated frequency f7 component. The eliminated frequency f7 component may be a component subject to thinning-out or a component subject to replacement.

Thus, in transmission power correction section 202, the transmission power of at least one of the frequency f1 through f6 and f8 components is increased based on transmission power Pa. For example, the transmission power of one of the components is increased by a proportion determined based on transmission power Pa. Alternatively, the transmission power is increased by a value determined based on transmission power Pa. Alternatively, the transmission power is increased to a value determined based on transmission power Pa.

Figure 9C:
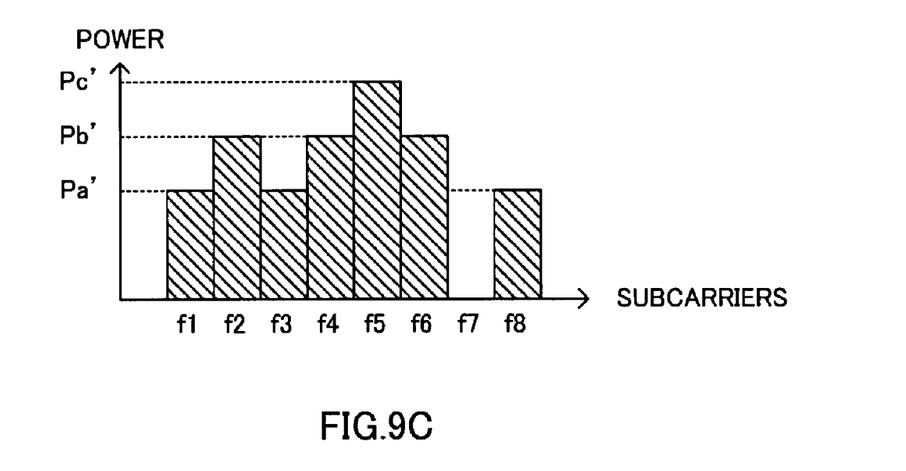
FIG. 9C is a drawing showing transmission power by subcarrier of a data signal on which transmission power correction has been executed.

In this example, as shown in FIG. 9C, transmission power Pa of the frequency f1, f3, and f8 components is increased to become transmission power Pa', transmission power Pb of the frequency f2, f4, and f6 components is increased to become transmission power Pb', and transmission power Pc of the frequency f5 component is increased to become transmission power Pc'. By this means, the utilization efficiency of transmission power Pdata can be improved. Furthermore, the proportion by which transmission powers Pa, Pb, and Pc are increased can be controlled, the width by which transmission powers Pa, Pb, and Pc are increased can be controlled, and the target value of increased transmission powers Pa, Pb, and Pc can be controlled.

In transmission power correction section 202, the transmission power of frequency f1 through f6 and f8 components (transmission power Pa, Pb, or Pc) is corrected so that the area of the hashed parts in FIG. 9A and the area of the hashed parts in FIG. 9C become equal.

Also, in transmission power correction section 202, the transmission power of frequency f1 through f6 and f8 components (transmission power Pa, Pb, or Pc) is multiplied by correction coefficient W to correct transmission power Pa, Pb, or Pc. Alternatively, for example, a value resulting from dividing transmission power Poff (in this example, Pa) equally among the number of frequencies f1 through f6 and f8 (that is, equally into seven), is added to the transmission power of frequency f1 through f6 and f8 components (transmission power Pa, Pb, or Pc) to correct transmission power Pa, Pb, or Pc. As equalizing the transmission power of the frequency f1 through f6 and f8 components (transmission power Pa, Pb, or Pc) in this way involves an increase of the same proportion or by the same value, for example, control can be simplified compared with a case in which the transmission powers are increased unequally.

Thus, according to this embodiment, since above-described transmission power control is performed in this way when replacement and thinning-out are performed, error rate characteristics on the receiver side when replacement or thinning-out is performed can be improved.

Embodiment 3

Figure 10:
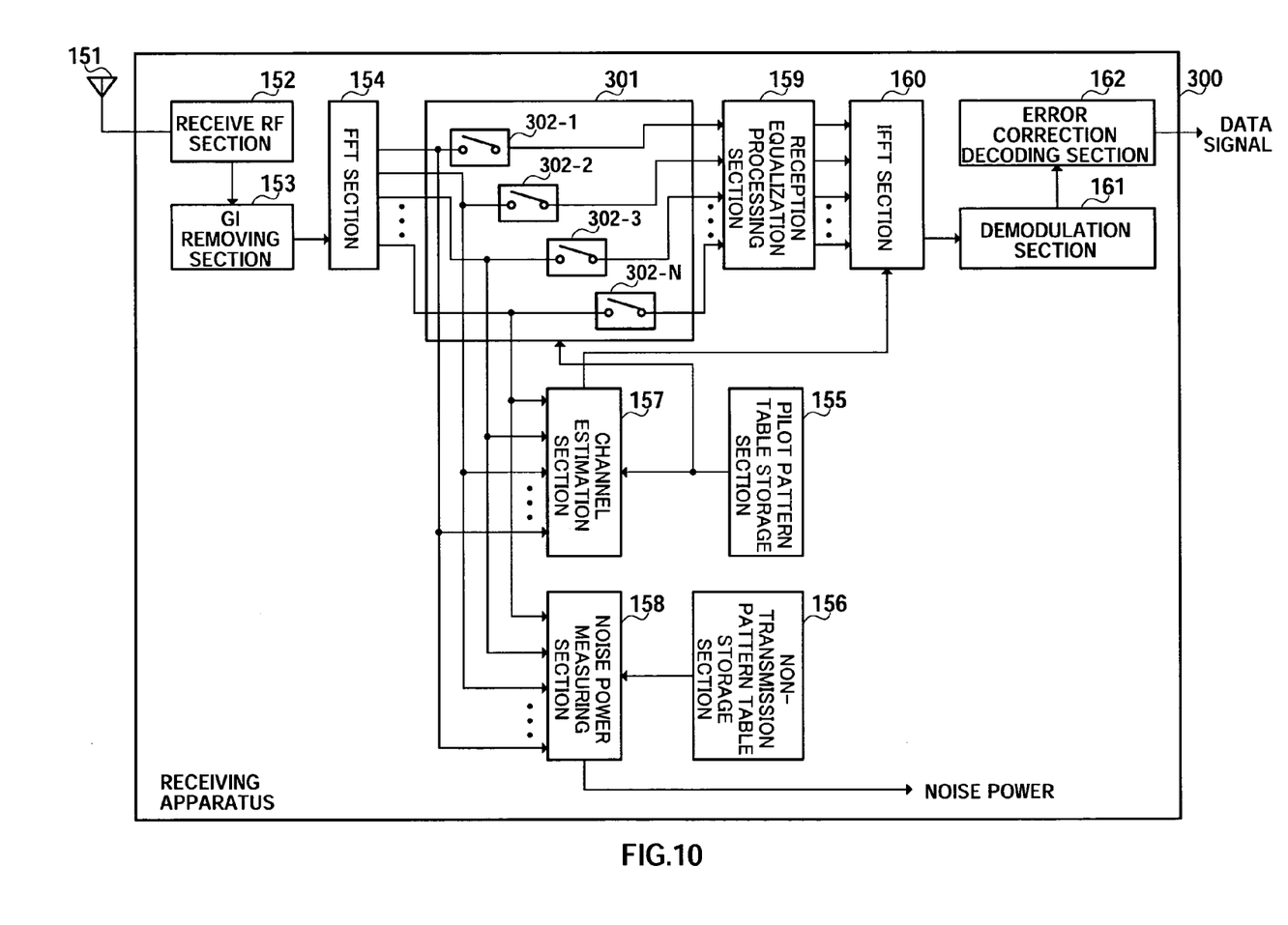
FIG. 10 is a block diagram showing the configuration of a receiving apparatus according to Embodiment 3 of the present invention.

FIG. 10 is a block diagram showing the configuration of a receiving apparatus according to Embodiment 3 of the present invention. Receiving apparatus 300 shown in FIG. 10 has a similar basic configuration to that of receiving apparatus 150 described in Embodiment 1, and therefore identical configuration elements are assigned the same reference numerals, and detailed descriptions thereof are omitted. Receiving apparatus 300 performs radio communication with transmitting apparatus 100 described in Embodiment 1 or transmitting apparatus 200 described in Embodiment 2.

In addition to the configuration elements of receiving apparatus 150, receiving apparatus 300 has a pilot channel thinning-out section 301. Pilot channel thinning-out section 301 has switching sections 302-1, 302-2, 302-3, . . . , 302-N corresponding to N components in a data signal on which FFT processing has been executed by FFT section 154. Switching sections 302-1 through 302-N all have the same configuration. Therefore, in the following description, any of these will be referred to simply as "switching section(s) 302."

Pilot channel thinning-out section 301 thins out a part corresponding to a pilot signal within a data signal on which FFT processing has been executed. More specifically, processing is performed whereby a signal of that part is output with both the I component and Q component replaced by a zero value. Pilot thinning-out is implemented by performing switching section 302 switching processing in accordance with a pilot pattern table stored in pilot pattern table storage section 155.

For example, when an input component from FFT section 154 does not correspond to a pilot signal, switching section 302 constantly outputs that input component to reception equalization processing section 159. On the other hand, when an input component from FFT section 154 corresponds to a pilot signal, switching section 302 switches the input/output state so that that input component is not output to reception equalization processing section 159.

Figure 11A:
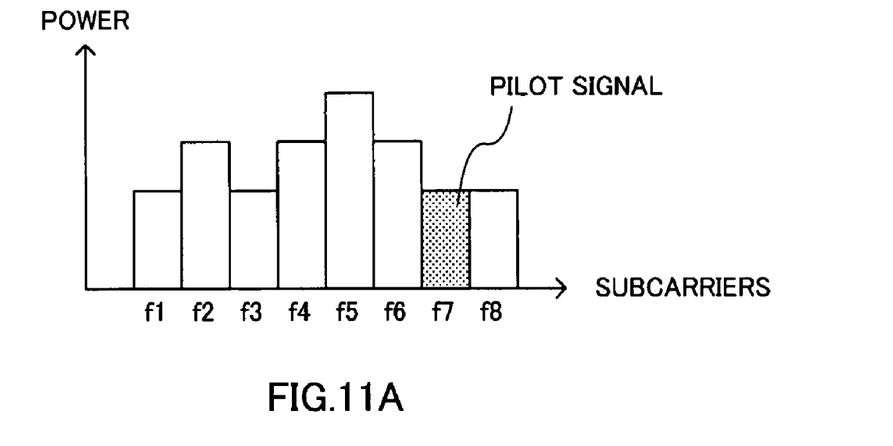
FIG. 11A is a drawing showing a data signal before pilot thinning-out according to Embodiment 3 of the present invention.
Figure 11B:
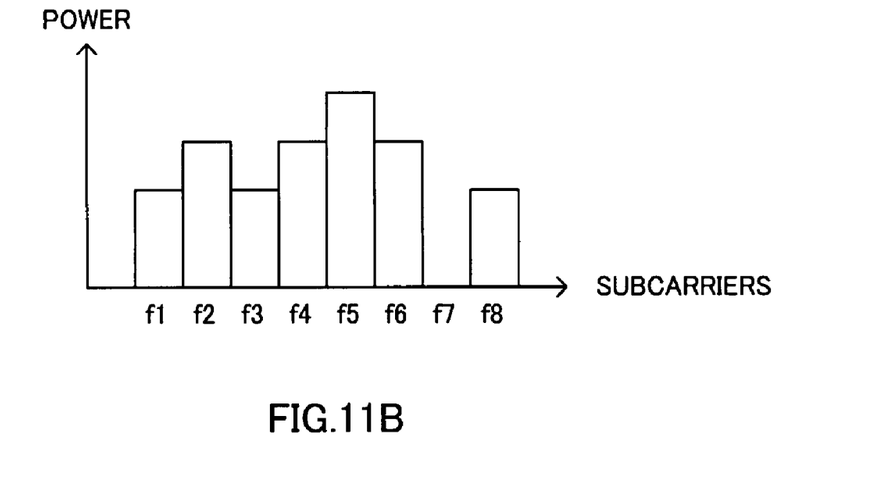
FIG. 11B is a drawing showing a data signal after pilot thinning-out according to Embodiment 3 of the present invention.

Pilot thinning-out will now be described in greater detail using FIG. 11A and FIG. 11B. Assume, for example, that, among input components from FFT section 154, the frequency f7 component corresponds to a pilot signal, as shown in FIG. 11A. In this case, pilot channel thinning-out section 301 inputs "0" for both the I component and Q component for the frequency f7 component. The data signal shown in FIG. 11B obtained as a result of this processing is passed to reception equalization processing section 159. At this time, reception equalization processing section 159 performs equalization processing on the frequency axis, based on channel estimation results, on the data signal in which the part corresponding to a pilot signal has been thinned out.

Figure 12:
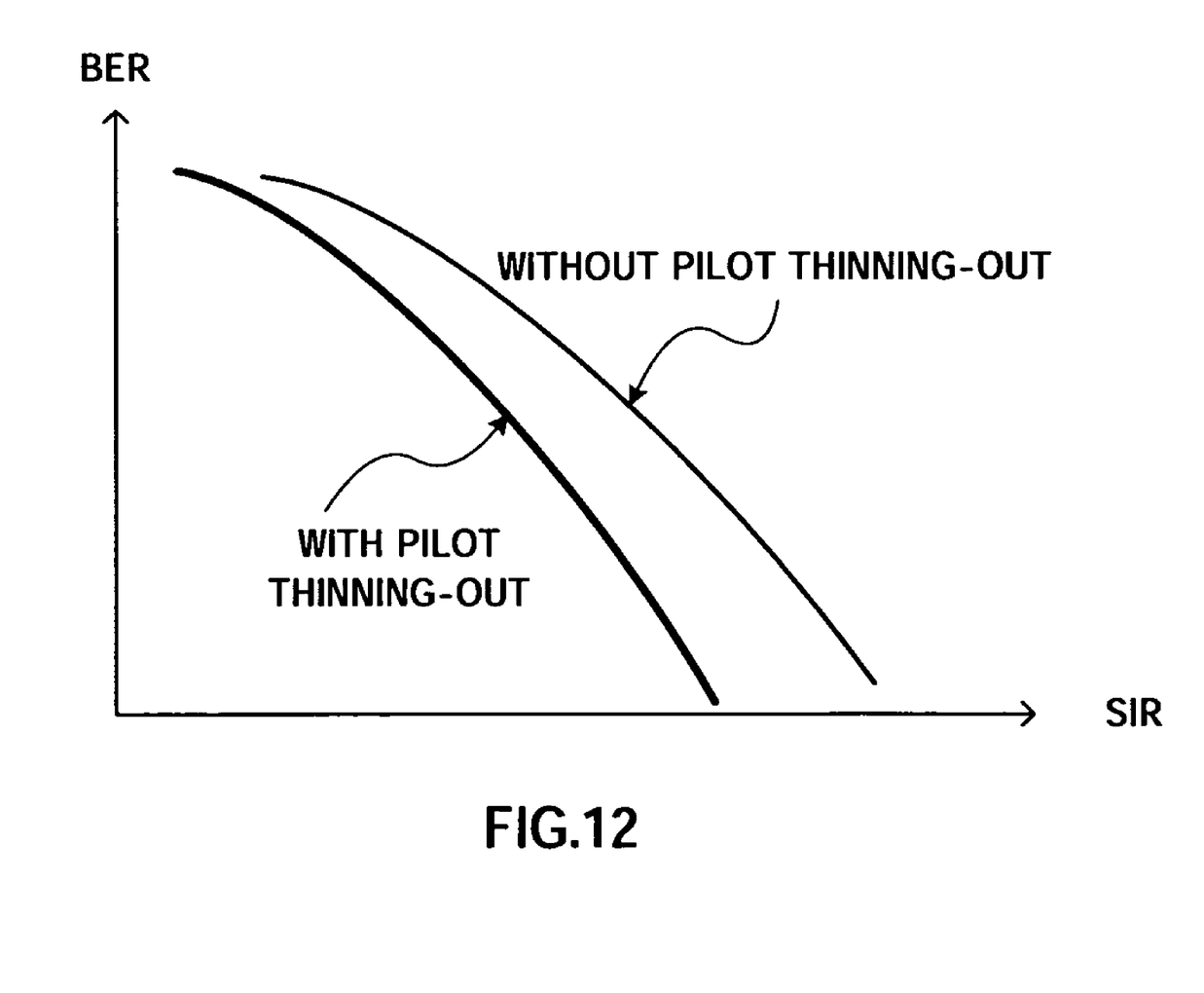
FIG. 12 is a drawing for explaining improvement of error rate characteristics due to pilot thinning-out according to Embodiment 3 of the present invention.

Thus, according to this embodiment, equalization processing on the frequency axis is performed on a data signal in which a part corresponding to a pilot signal has been thinned out, making it possible to prevent a pilot signal from imposing interference on a data signal. Consequently, error rate characteristics when pilot thinning-out is performed can be improved compared with a case in which pilot thinning-out is not performed, as shown in FIG. 12.

The function blocks used in the descriptions of the above embodiments are typically implemented as LSIs, which are integrated circuits. These may be implemented individually as single chips, or a single chip may incorporate some or all of them.

Here, the term LSI has been used, but the terms IC, system LSI, super LSI, and ultra LSI may also be used according to differences in the degree of integration.

The method of implementing integrated circuitry is not limited to LSI, and implementation by means of dedicated circuitry or a general-purpose processor may also be used. An FPGA (Field Programmable Gate Array) for which programming is possible after LSI fabrication, or a reconfigurable processor allowing reconfiguration of circuit cell connections and settings within an LSI, may also be used.

In the event of the introduction of an integrated circuit implementation technology whereby LSI is replaced by a different technology as an advance in, or derivation from, semiconductor technology, integration of the function blocks may of course be performed using that technology. The adaptation of biotechnology or the like is also a possibility.

INDUSTRIAL APPLICABILITY

A radio transmitting apparatus, radio receiving apparatus, radio transmitting method, and radio receiving method of the present invention are suitable for use in a base station apparatus or mobile station apparatus used in a frequency equalization single-carrier transmission system or the like.

The invention claimed is:

1. A radio transmission apparatus comprising:
a conversion section that converts a time-domain data signal into a frequency-domain data signal;
a replacement section that replaces a first part of frequency components of the frequency domain data signal by a pilot signal, and thins out a second part of the frequency components of the frequency-domain data signal, to obtain a replaced frequency-domain data signal;
a control section that controls a transmission power of a third part of the frequency components of the replaced frequency-domain data signal, the third part of the frequency components being different from both the first part of the frequency components and the second part of the frequency components;

an inversion section that inverts the replaced frequency-domain data signal into a replaced time-domain data signal; and a transmission section that transmits the replaced time-domain data signal on a single carrier.

2. The radio transmission apparatus according to claim 1, wherein the control section controls the transmission power of the third part of the frequency components of the replaced frequency-domain data signal when the replacing of the first part or the thinning-out of the second part is performed by the replacement section.

3. The radio transmission apparatus according to claim 1, wherein the control section makes a value of the transmission power of the third part of the frequency components of the replaced frequency-domain data signal identical to a value of a transmission power assigned beforehand to the replaced frequency-domain data signal.

4. The radio transmission apparatus according to claim 1, wherein the control section increases the transmission power of the third part of the frequency components by a predetermined proportion.

5. The radio transmission apparatus according to claim 1, wherein the control section increases the transmission power of the third part of the frequency components by a predetermined value or up to the predetermined value.

6. The radio transmission apparatus according to claim 1, wherein the control section increases equally a transmission power of each of a fourth part of the frequency components and a fifth part of the frequency components, the fourth part and the fifth part of the frequency components being different from both the first part of the frequency components and the second part of the frequency components.

7. A radio reception apparatus comprising:

a reception section that receives a data signal which is transmitted on a single carrier and comprises a plurality of frequency components, and in which a first part of the plurality of frequency components is replaced by a pilot signal and a second part of the plurality of frequency components is thinned out;

a conversion section that converts the data signal into a frequency-domain data signal;

a channel estimation section that performs a channel estimation for each of the plurality of frequency components of the frequency-domain data signal, using the pilot signal which replaced the first part of the plurality of frequency components of the frequency-domain data signal;

a measuring section that measures a received power of the second part of the plurality of frequency components;

a thinning-out section that thins out the first part of the plurality of frequency components of the frequency-domain data signal and outputs a thinned-out frequency-domain data signal; and an equalization processing section that performs equalization processing on the thinned-out frequency-domain data signal, on a frequency axis, based on a channel estimation result.

8. A radio transmission method performed at a radio transmission apparatus, comprising:

converting a time-domain data signal into a frequency-domain data signal;

replacing a first part of frequency components of the frequency-domain data signal by a pilot signal and thinning out a second part of the frequency components of the frequency-domain data signal to obtain a replaced frequency-domain data signal;

controlling a transmission power of a third part of the frequency components of the replaced frequency-domain data signal, the third part of the frequency components being different from both the first part of the frequency components and the second part of the frequency components;

inverting the replaced frequency-domain data signal into a replaced time-domain data signal; and transmitting the replaced time-domain data signal on a single carrier.

9. A radio reception method performed at a radio reception apparatus, comprising:

receiving a data signal which is transmitted on a single carrier and comprises a plurality of frequency components, and in which a first part of the plurality of frequency components is replaced by a pilot signal and a second part of the plurality of frequency components is thinned out;

converting the data signal into a frequency-domain data signal;

performing a channel estimation for each of the plurality of frequency components of the frequency-domain data signal, using the pilot signal which replaced the first part of the plurality of frequency components of the frequency-domain data signal;

measuring a received power of the second part of the plurality of frequency components;

thinning out the first part of the plurality of frequency components of the frequency-domain data signal to obtain a thinned-out frequency-domain data signal; and performing equalization processing on the thinned-out frequency-domain data signal, on a frequency axis, based on a channel estimation result.

* * * * *